United States Patent [19]

Payne et al.

[11] Patent Number: 4,791,309

[45] Date of Patent: Dec. 13, 1988

[54] ELECTRICAL CONTROL SYSTEMS

[75] Inventors: Richard D. Payne, Surrey; Eric E. Simpson, Essex, both of United Kingdom

[73] Assignee: Thamesmead Engineering Limited, London, England

[21] Appl. No.: 139,177

[22] Filed: Dec. 28, 1987

Related U.S. Application Data

[63] Continuation of Ser. No. 498,090, Aug. 16, 1983, abandoned.

[30] Foreign Application Priority Data

Sep. 21, 1982 [GB] United Kingdom ................ 8226919

[51] Int. Cl.[4] .......................... F02G 3/00; H02P 9/04
[52] U.S. Cl. .................................. 290/40; 290/40 A; 290/52; 290/40 B; 290/40 C
[58] Field of Search ................. 290/40, 40 R, 40 A, 290/40 B, 40 C, 42, 43, 52, 53, 54; 60/645, 646, 660, 661, 662, 663, 667, 676, 677, 679, 680; 307/34, 35, 36, 37, 38, 39, 40, 41, 42, 43, 67, 68, 69, 70, 71, 72, 73, 74, 75, 76, 77, 78, 79, 80, 81, 82, 83, 84, 85, 86, 87

[56] References Cited

U.S. PATENT DOCUMENTS

| | | | |
|---|---|---|---|
| 2,832,030 | 4/1958 | Fairweather | 290/40 R |
| 3,342,999 | 4/1967 | Townsend | 290/40 R |
| 3,546,472 | 12/1970 | Hoffman | 290/52 X |
| 4,109,160 | 8/1978 | Goto | 290/52 |
| 4,117,344 | 9/1978 | Boerstler et al. | 290/40 C X |
| 4,136,286 | 1/1979 | O'Halloran et al. | 290/40 R X |
| 4,177,387 | 12/1979 | Malone | 290/40 R |
| 4,208,591 | 6/1980 | Yannone et al. | 290/40 R |
| 4,220,868 | 9/1980 | Takeuchi | 290/40 A X |
| 4,352,024 | 9/1982 | Geary et al. | 290/52 |
| 4,417,194 | 11/1983 | Curtiss et al. | 290/40 B X |

FOREIGN PATENT DOCUMENTS

| | | | |
|---|---|---|---|
| 0007389 | 2/1980 | European Pat. Off. | 290/52 |
| 0066490 | 12/1982 | European Pat. Off. | |
| 286240 | 2/1953 | Switzerland. | |

Primary Examiner—William M. Shoop, Jr.
Assistant Examiner—Paul Ip
Attorney, Agent, or Firm—Stevens, Davis, Miller & Mosher

[57] ABSTRACT

A hydroelectric power system has a reservoir (prime mover) (17) driving an electrical generator (10) which supplies a consumer load (B) and an auxiliary load (14). A control system (11) operates control (15) for the prime mover, control (13) for the auxiliary load and/or control (12) for the consumer load in response to a signal from the generator (10) or some other source, so that the supply is stabilized so far as possible to a minimum. Normally no energy is dissipated in the auxiliary load, except during a control sequence.

12 Claims, 1 Drawing Sheet

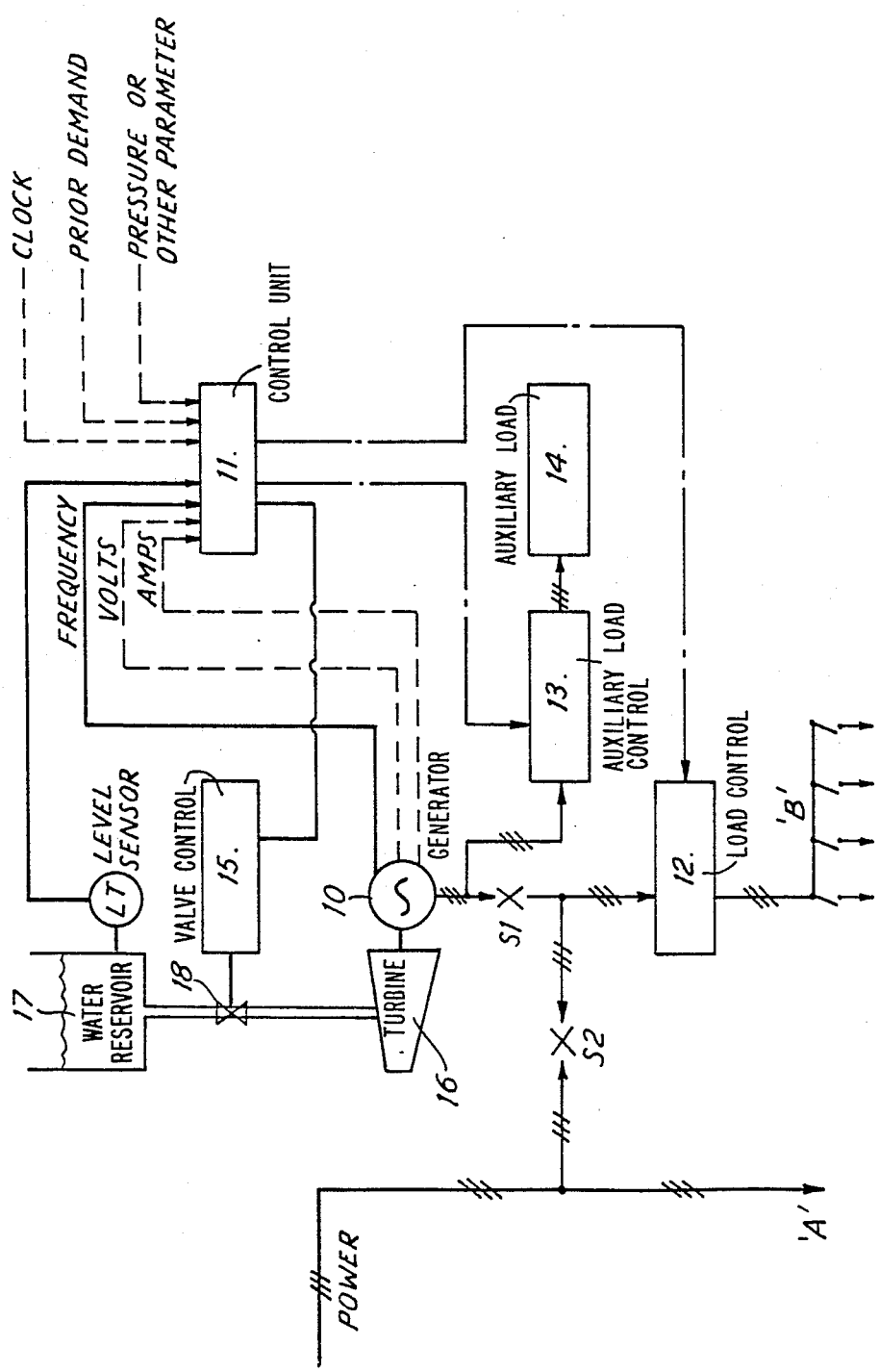

ELECTRICAL CONTROL SYSTEMS

This application is a continuation of application Ser. No. 498,090, filed Aug. 16, 1983, now abandoned.

BACKGROUND OF THE INVENTION

This invention relates to electrical control systems, in particular systems for controlling generating sets, and most particularly hydroelectric generating systems.

A generating set includes a prime mover and an electrical generator, and may supply a load within its own system or may supply a grid. The prime mover might be a water-driven turbine, or a diesel engine, for example. The output power to the load from the generating set is not readily controlled by mechanical means, and not rapidly. Electrical control tends to involve dissipation of energy in a non-useful way.

Proposals have been made to provide control of a generator by keeping the load constant. In British patent specification No. 2006998A, for example, a ballast load is shunted across the actual load, and is controlled in dependence upon the generator output voltage or frequency. Nevertheless, such systems are incomplete, in that although the load supplied may be kept substantially constant, nothing is done to alter the running of the prime mover, so that the generator output is matched to the new actual load.

SUMMARY OF THE INVENTION

By contrast, in Boerstler et al., U.S. Pat. No. 4,117,344, as in many other early proposals, a multitude of controls are applied to the prime mover and/or the generator, in dependence on a feedback signal. This, however, is a slow process which cannot respond rapidly enough, particularly for a hydroelectric generator system, which can run up to a dangerous speed if the consumed load is suddenly reduced. Although Boerstler also envisages a shunt load, no control is applied to this and a steady operating state can be achieved in which the generator is adjusted to accommodate a continuous dissipation in the shunt load.

Accordingly, the invention proposes an electrical system comprising a prime mover driving an electrical generator connected to a consumer load and an auxiliary load, and a control system including a sensor responsive to parameters of the generator system, arranged so that in response to said sensor or an external signal, said loads are controlled to receive varying proportions of the output of the generator, and in addition the power output of the prime mover to the generator is controlled, wherein control is effected so that normally the auxiliary load receives no or a minimum of power.

The total load control may additionally be achieved by means of a device in series with the load.

The control of the prime mover, effecting eventually a control of the output of the generator, may be, for example, control of the gates of a hydraulic turbine, or of the throttle of a diesel engine.

The systems according to the invention have many advantages and uses.

A first allows any generating system to accommodate a step change of consumer load from 100% to 0% by virtually instantaneous diversion of excess power into an auxiliary resistance bank whilst at the same time, more slowly reducing the prime mover output so as to balance the new consumer demand.

A particular use is for hydro-electric generating plant of the reaction turbine type where reduction of the water flow through the machine can take some seconds and the machine will accelerate to an overspeed of typically about 30% whilst the control gates are being closed to the new position. At the same time care must be exercised to prevent an excessive pressure rise from occurring in the supply penstock due to the hydraulic shock effect of sudden closure.

Using the new system, the speed rise upon 100% load shedding can be maintained typically within +1%, whilst allowing the water flow to be reduced as slowly as necessary in consideration of the hydraulic conditions in the penstock.

Conversely, it is possible to accommodate a steep increase in consumer load from 0-100% given that a prior load demand signal is available. Using this signal, the prime mover power output can be increased to maximum and the excess power generated temporarily dissipated into the auxiliary load. Once generating at full power, then the new consumer load may be switched on, and the control system can immediately transfer power into that load from the auxiliary load.

This is also advantageous in hydro-electric reaction-type machines, due to the time taken to open the gates and increase water flow into the unit. Without this system, large flywheels are commonly required to minimise the speed drop which otherwise occurs.

The invention also finds use on diesel driven generating plant where a turbocharged engine is used. These generally cannot accept steep load increases greater than about 60% of their rated power due to the time necessary to accelerate the blower to full speed. Use of the invention enables the power to be increased before the new load is switched on.

If a prior load demand signal is not available, then a series load control unit may in certain cases be used in the system to soften the suddenness of the effect of switching the new load onto the prime mover.

Use of the invention is recommended for many electrical consumers who require voltage and frequency kept within narrow limits for correct functioning, e.g. computer power supplies, lighting circuits, etc. With conventional governing methods, these consumers cannot be connected onto supply systems subject to heavy switching transients, as the generating sets would not be able to maintain speed and voltage accurately enough to keep within the required tolerances. A system according to the invention, including either a prior load demand signal or series load control unit would be able to meet this requirement.

The invention further finds application when the power to the consumer is to be controlled so that the supply system is not overloaded either when switching on loads or when generating at less than normal capacity. A particular application is on hydro-electric or steam turbine driven synchronous generating sets supplying resistive loads such as storage or immersion heaters, or alternatively feeding into a battery system for energy storage. Hydro sets are commonly used to recover energy in this way from small streams in remote areas.

In this case, a series load control unit is used to ensure that when switching on any load, this is smoothly imposed onto the prime mover in a way which allows time for the prime mover to increase power to the new output required. In case the prime mover cannot provide sufficient power then the series load control device will restrict output to the load so as to maintain the controlled variable (frequency, voltage etc).

BRIEF DESCRIPTION OF THE DRAWING

In order that the invention shall be clearly understood, an exemplary embodiment thereof will now be described with reference to the accompanying drawing, which shows a block diagram of a governing system for controlling a water turbine driven generating set.

DESCRIPTION OF THE PREFERRED EMBODIMENT

A water turbine 16 driving a generator 10 is supplied by a reservoir 17 through a control gate 18. This generator set supplies essential consumers B in the event of mains failure. Otherwise, the generator is in parallel with the mains network via an isolating switch S2, and supplies also non-essential consumers A. In addition the generator set can be isolated by switch S1. In the drawing, the main supply is shown in bold lines crosshatched; the control connections are shown as a dotted bold line; the dashed lines represent additional control possibilities.

A manual or automatic controller 11 receives as its basic input signal the frequency of the generator 10, and uses this as the determining factor in issuing output control signals. Alternative input signals might be the voltage or current output of the generator. The supply from the generator to consumers B, and the output of the generator are controlled in three ways: by a series connected load control 12 e.g. a thyristor which can reduce the voltage to consumers B; by operation of an auxiliary load 14, e.g. resistors or accumulators which can instantaneously absorb or shed excess power; and by influencing the power input to the generator by opening and closing control gate 18 using a valve control 15.

During startup and synchronisation to the mains, switch S1 is opened, and the desired speed to produce a desired generation frequency, i.e. normally mains frequency, is achieved by external operation of controller 11. This is used to operate the auxiliary load control 13, e.g. a thyristor. The valve control 15 is held at this stage in a partly open state to allow for control in either direction.

At synchronism, S1 is closed and the speed setting of controller 11 is raised about 1 Hz above that of the mains, and a level control function put in operation. The valve control 15 is then regulated by controller 11 so as to maintain a desired level in the reservoir 17. Power generated is fed to consumers A and B, and any shortfall from generator 10 is supplied from the mains.

In the event of mains failure, switch S2 is opened and the generator set is required to feed consumers B in isolation. In these circumstances, it is unlikely that the output of the set will precisely match the demand, and its speed will therefore rise or fall depending upon whether the output is greater or less than required. The speed change will alter the frequency, and this is sensed in the controller 11.

It is then possible immediately to manipulate the auxiliary load control 13 so as to match the load to the actual output, but this may involve wasteful dissipation of energy. Therefore simultaneously, controller 11 will pass a signal to valve control 15 thus increasing or decreasing appropriately the power input to the generator 10. In certain circumstances, of course, it may be necessary also to actually reduce the total load of consumers B using control 12 if it cannot be supplied entirely by the generator set.

Normally, however, the system is operated by controller 11 so that there is no continuous dissipation of energy in auxiliary load 14, or any power reduction to consumers by control 12 during steady state operations at any level of electrical system loading.

Since an increased flow may cause the level of reservoir 17 to drop unduly, a warning signal from level sensor LT may be necessary to alert an operator to the continuing depletion.

In a modification of this system, certain vital consumers may receive their load by a supply tapped in between switch S1 and control 12. They will be supplied then without any danger of voltage drop. In addition to feedback signals from the generator 10, external signals derived e.g. from a clock or timer, or water pressure in reservoir 17, may be applied to the controller 11. Moreover, an external signal may be applied in advance of an expected rise or drop in consumer load, as indicated by the signal marked "Prior Demand". In this way, the system can absorb the change without excessive fluctuations of the operating parameters.

What is claimed is:

1. A control system for an electrical power generating system comprising:
    a prime mover, an electrical generator driven thereby, consumer load supplied from the generator, an auxiliary control load, and a control system;
    said control system comprising a controller, a sensor for one or more parameters of the generating system and producing a signal responsive thereto, first control means for said prime mover whereby the output of the generator is influenced, second control means associated with said auxiliary control load whereby the proportions of the power received by the consumer load and the auxiliary control load are controlled, and connections from the controller to the first and second control means;
    the controller, in response to said signal from the sensor, effecting control of said proportions by alteration of the second control means; and also variation of the power output of the prime mover to the generator, and thus the power output of the generator, in a sense to allow steady state operation in which the auxiliary control load receives no or a minimum of power.

2. An electrical system as claimed in claim 1, wherein additionally said control is effected so that the power output of the generator tends to equal the power consumed by the load.

3. An electrical system as claimed in claim 1 or 2, wherein an additional control is provided in series with the consumer load whereby the power consumed can be controlled so as to maintain a value of said one or more parameters for a period while the power output of the generator is adjusted.

4. An electrical system as claimed in claim 1 or 2, wherein additional consumer load can be supplied instantaneously by applying an external control signal in advance to increase generator output and to temporarily absorb excess power in said auxiliary load until required for the additional consumer load.

5. A electrical system as claimed in claim 3, wherein said consumer load is in two parts in parallel, and said additional control can be applied to one part in order to protect the other part from variations in supply characteristics.

6. An electrical system as claimed in claim 1 wherein the parameter sensed is the frequency of the generator output.

7. An electrical system as claimed in claim 1 wherein said prime mover is a water turbine and one of the parameters sensed is the water level of the turbine water supply.

8. An electrical system as claimed in claim 6 or 7, wherein additional voltage or current are sensed.

9. An electrical system as claimed in claim 1 wherein said external signal is determined by a clock.

10. A method of operating an electrical system including a prime mover driving an electrical generator connected to a consumer load and an auxiliary load, comprising the steps of continuously sensing one or more parameters of the generator system, and controlling the power or the proportion of the power recived by the respective loads, and also the power output of the prime mover so that in normal operation the auxiliuary load receives no or a minimum of power.

11. A control system for an electric power generator system comprising:
a prime mover, an electrical generator driven thereby, a load continuously supplied from the generator during each of start up, steady state and overspeed conditions, and a control system;
said control system comprising a controller, a sensor for one or more parameters of the generator system and producing a signal responsive thereto, first control means for said prime mover whereby the output of the generator is influenced while said load is being supplied by said generator, second control means for controlling the power or the proportion of the power received by the load, and connections from the controller to the first and second control means;
the controller, in response to said signal from the sensor, effecting control of the power or the proportion of the power received by the load by alteration of the second control means; and also variation of the power output of the primer mover to the generator, and thus of the power output of the generator.

12. A control system for an electric power generator system comprising: a prime mover, an electrical generator driven thereby, a consumer load and an auxiliary electrical load continuously supplied from the generator and a control system; said control system comprising a controller, a sensor for one or more parameters of the generator system and producing a signal responsive thereto, first control means for said prime mover whereby the output of the generator is influenced, second control means for controlling the power or the proportion of the power received by the loads, and connections from the controller to the first and second control means; the controller, in response to said signal from the sensor, effecting control of the power or the proportion of the power received by the loads by alteration of the second control means; and also variation of the power output of the prime mover to the generator, and thus of the power output of the generator by alteration of the first control means.

* * * * *